US011417996B2

(12) United States Patent
Nemoto

(10) Patent No.: US 11,417,996 B2
(45) Date of Patent: Aug. 16, 2022

(54) CONNECTOR FITTING DEVICE

(71) Applicant: Yazaki Corporation, Tokyo (JP)

(72) Inventor: Shin Nemoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 382 days.

(21) Appl. No.: 16/775,674

(22) Filed: Jan. 29, 2020

(65) Prior Publication Data

US 2020/0244026 A1 Jul. 30, 2020

(30) Foreign Application Priority Data

Jan. 30, 2019 (JP) ................................. 2019-013946

(51) Int. Cl.
*H01R 43/26* (2006.01)
*B25J 9/16* (2006.01)
*B25J 15/00* (2006.01)
*B60R 16/023* (2006.01)
*H01R 13/50* (2006.01)

(52) U.S. Cl.
CPC ............ *H01R 43/26* (2013.01); *B25J 9/1687* (2013.01); *B25J 15/0028* (2013.01); *B60R 16/023* (2013.01); *H01R 13/50* (2013.01); *H01R 2201/26* (2013.01)

(58) Field of Classification Search
CPC .... H01R 43/26; H01R 13/50; H01R 2201/26; B25J 9/1687; B25J 15/0028; B25J 15/0475; B25J 15/00; B60R 16/023; B23Q 7/043
See application file for complete search history.

(56) References Cited

U.S. PATENT DOCUMENTS

| | | | | |
|---|---|---|---|---|
| 3,139,302 A * | 6/1964 | Orloff | ................... | B65G 47/90 294/902 |
| 4,042,122 A * | 8/1977 | Espy | ................... | B25J 15/0253 901/29 |
| 4,647,100 A * | 3/1987 | Lessway | ................ | B25J 15/028 901/39 |
| 5,028,203 A * | 7/1991 | Masini | ................... | B65G 61/00 294/902 |
| 5,494,325 A * | 2/1996 | Liu | ........................ | B64G 1/641 294/902 |
| 9,868,219 B1 * | 1/2018 | Su | ........................ | B25J 15/0475 |
| 2013/0020820 A1 * | 1/2013 | Bieler | .................... | B25J 15/026 29/428 |
| 2018/0001849 A1 | 1/2018 | Abe et al. | | |

(Continued)

FOREIGN PATENT DOCUMENTS

| EP | 3 012 073 A1 | 4/2016 |
|---|---|---|
| EP | 3 064 324 A1 | 9/2016 |

(Continued)

*Primary Examiner* — Gregory W Adams
(74) *Attorney, Agent, or Firm* — Sughrue Mion, PLC

(57) ABSTRACT

A connector fitting device for fitting a female connector to a male connector includes a movable arm body connected to a base on a base end side of the movable arm body and a gripper connected to a distal end side of the movable arm body. The connector fitting device is configured to move the gripper to an arbitrary position in a three-dimensional space and in an arbitrary direction in the three-dimensional space. The movable arm body includes a device main body, a first arm, a second arm, and a third arm.

8 Claims, 13 Drawing Sheets

(56) References Cited

U.S. PATENT DOCUMENTS

2018/0021950 A1   1/2018  Shimodaira
2018/0180085 A1   6/2018  Watanabe et al.

FOREIGN PATENT DOCUMENTS

| JP | 61-35776 U | 3/1986 |
| JP | 4441615 B2 | 3/2010 |
| JP | 2015-196208 A | 11/2015 |
| JP | 2018-007378 A | 1/2018 |
| JP | 2018-12183 A | 1/2018 |
| JP | 2018-103309 A | 7/2018 |

* cited by examiner

CONNECTOR FITTING DEVICE

CROSS-REFERENCE TO RELATED APPLICATIONS

The present application is based on, and claims priority from Japanese Patent Application No. 2019-013946, filed on Jan. 30, 2019, the entire contents of which are incorporated herein by reference.

BACKGROUND

Technical Field

The present disclosure relates to a connector fitting device for fitting a connector to an opponent connector.

Related Art

As illustrated in FIG. 13, a hybrid vehicle 100 includes wire harnesses WH1 to WH3. The wire harnesses WH1 to WH3 electrically connect a junction box 102, which is connected to a battery 101, with an inverter unit 103. The wire harness WH1 is connected to the junction box 102.

The wire harness WH2 is connected to the inverter unit 103. The wire harness WH3 electrically connects the wire harnesses WH1 and WH2.

Connections between a connector 110 of the junction box 102 and a connector of the wire harness WH1 (not illustrated), a connector 111 of the inverter unit 103 and a connector of the wire harness WH2 (not illustrated), a connector 112 of the wire harness WH1 and a connector 113 of the wire harness WH3, and a connector 114 of the wire harness WH2 and a connector 115 of the wire harness WH3 are achieved by mate fitting.

Conventionally, an operator has made such mating connections of the connectors manually.

SUMMARY

A fitting operation of the connectors, however, is a burden to the operator, and there has been a need for reducing the burden.

The present disclosure has been made to solve the above-described problem, and it is an object of the present disclosure to provide a connector fitting device that reduces a burden to an operator who performs a fitting operation the connectors.

One aspect of the present disclosure is a connector fitting device for fitting a first connector to a second connector, including a movable arm body connected to a base on a base end side of the movable arm body, and a gripper connected to a distal end side of the movable arm body and capable of gripping the first connector, in which the connector fitting device configured to move the gripper to an arbitrary position in a three-dimensional space and in an arbitrary direction in the three-dimensional space.

According to the present disclosure, the movable arm body moves the gripper to a connector feeding position, the gripper grips the connector, and the movable arm body moves the gripped connector to a fitting position to an opponent connector, whereby the movable arm body moves the connector in a fitting direction to the opponent connector for fitting. This eliminates the need for the operator to perform the fitting operation in person, and the operator only needs to operate the connector fitting device or set an automatic operation, thus reducing the burden to the operator.

DETAILED DESCRIPTION

Figure 1:
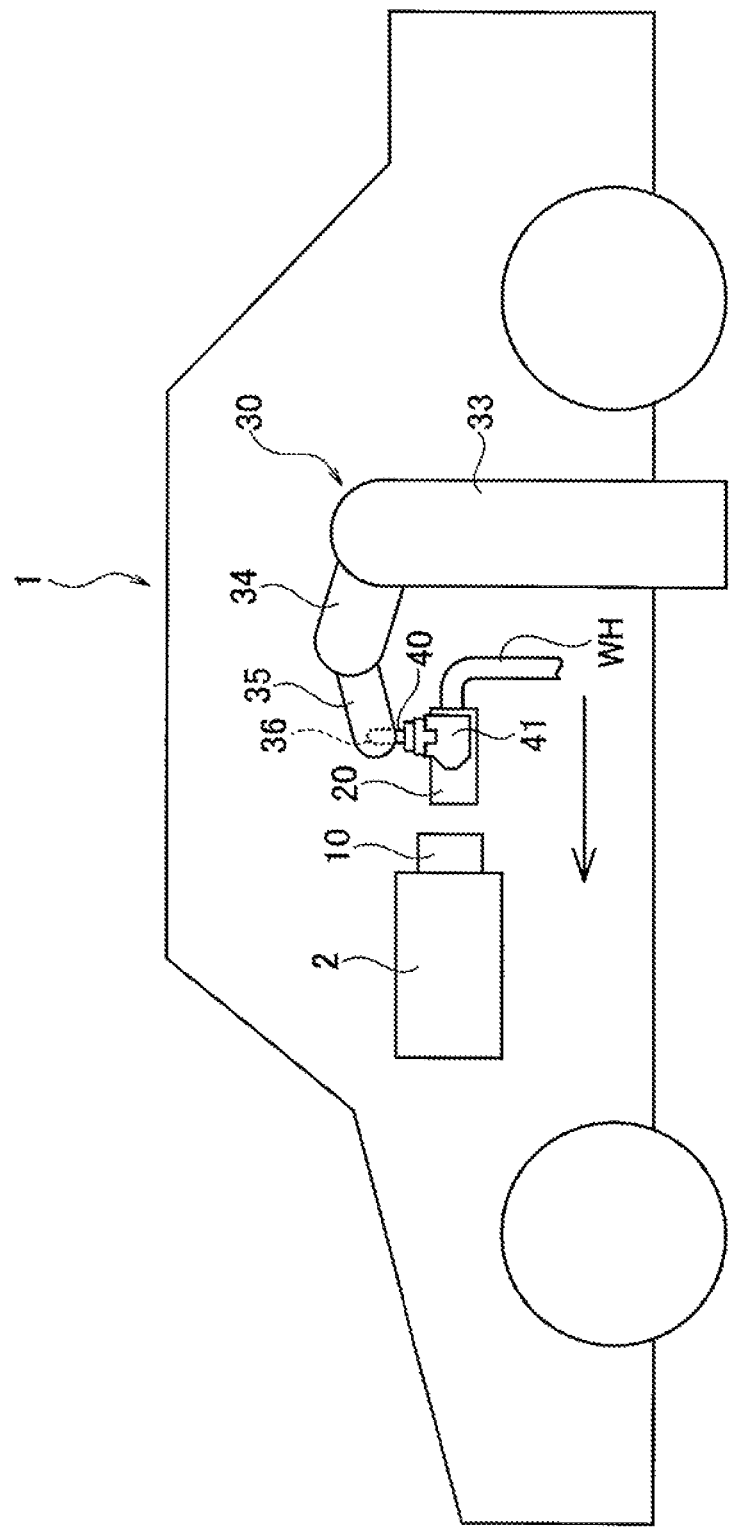
FIG. 1 is a conceptual diagram for explaining connector fitting by a connector fitting device according to a first embodiment of the present disclosure.

Various embodiments will be described hereinafter with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present disclosure by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

FIGS. 1 to 6 illustrate a first embodiment of the present disclosure. As illustrated in FIG. 1, a housing 2 for various sensors, an electronic control unit (ECU), and so on is mounted in the vehicle 1. A male connector 10 serving as an opponent connector (second connector) is attached to the housing 2. The male connector 10 is fixed at a determined position and in a determined direction in the vehicle 1. A female connector (first connector) 20 connected to the terminal of a wire harness WH is fitted to the male connector 10, whereby the above-described sensors and the electronic control unit are connected to the system of the vehicle via a wire harness (cable) WH.

Figure 2A:
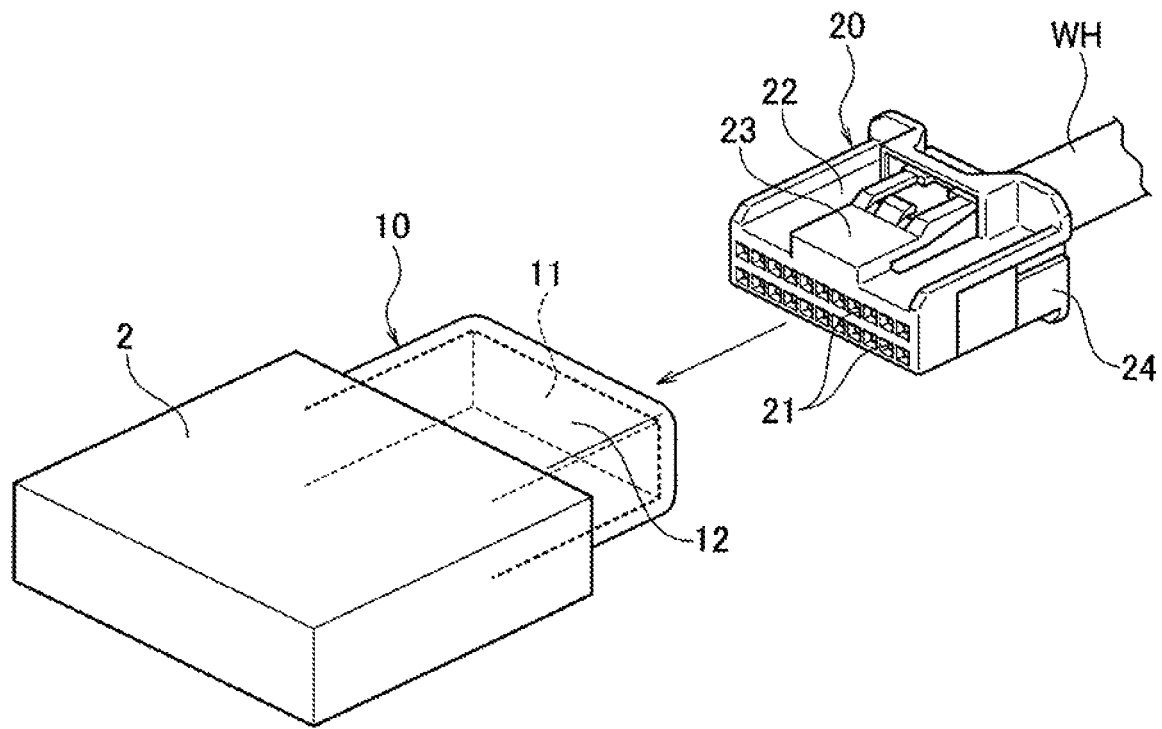
FIG. 2A is a perspective view illustrating a state in which a female connector is located at a feeding position with respect to a male connector in the first embodiment.
Figure 2B:
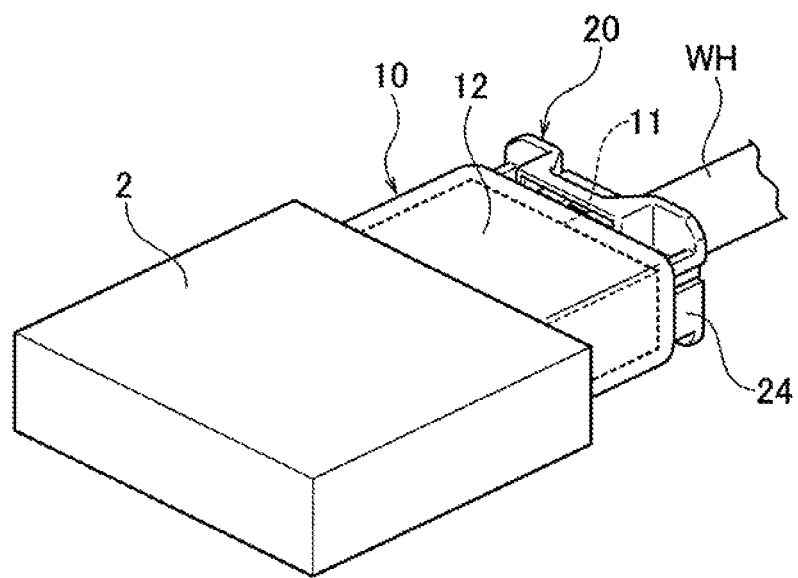
FIG. 2B is a perspective view illustrating a state in which the female connector is fitted to the male connector.

Thus, the female connector 20 of the wire harness WH is fitted to the male connector 10 fixed at a determined position and in a determined direction in the vehicle 1 using a connector fitting device (hereinafter referred to as a fitting device) 30. Specifically, the female connector 20 connected to the wire harness WH is arranged at a feeding position as illustrated in FIG. 2A. The female connector 20 is conveyed to the position of the male connector 10 fixed at the determined position and in the determined direction in the vehicle 1, and is fitted to the male connector 10 as illustrated in FIG. 2B.

First, the male connector 10 and the female connector 20 are described. As illustrated in FIGS. 2A and 2B, the male connector 10 includes a housing 12 having a connector fitting chamber (hereinafter referred to as a fitting chamber) 11, and a plurality of male terminals (not illustrated) arranged in a protruding manner in the fitting chamber 11 of the housing 12. The fitting chamber 11 has a substantially rectangular parallelepiped space, with one surface opened to the outside. Through this opening, the female connector 20 is inserted into and fitted to the male connector 10. An opponent housing lock (not illustrated) is provided in the fitting chamber 11.

The female connector 20 includes a housing 22 having a plurality of terminal accommodating chambers 21 each having an open front surface, and female terminals (not illustrated) each accommodated in the terminal accommodating chambers 21. The housing 22 has a substantially rectangular parallelepiped shape. A housing lock 23 is provided on the upper surface of the housing 22. A surface to be clamped 24 is formed at a rearward position of both side surfaces of the housing 22. The surface to be clamped 24 is, for example, a flat surface and is clamped by a pair of clamping portions 41 of the fitting device 30 described below. The wire harness WH is connected to individual female terminals (not illustrated) and pulled out from the rear surface of the housing 22. In other words, the female connector 20 is connected to the end of the wire harness WH.

Figure 3:
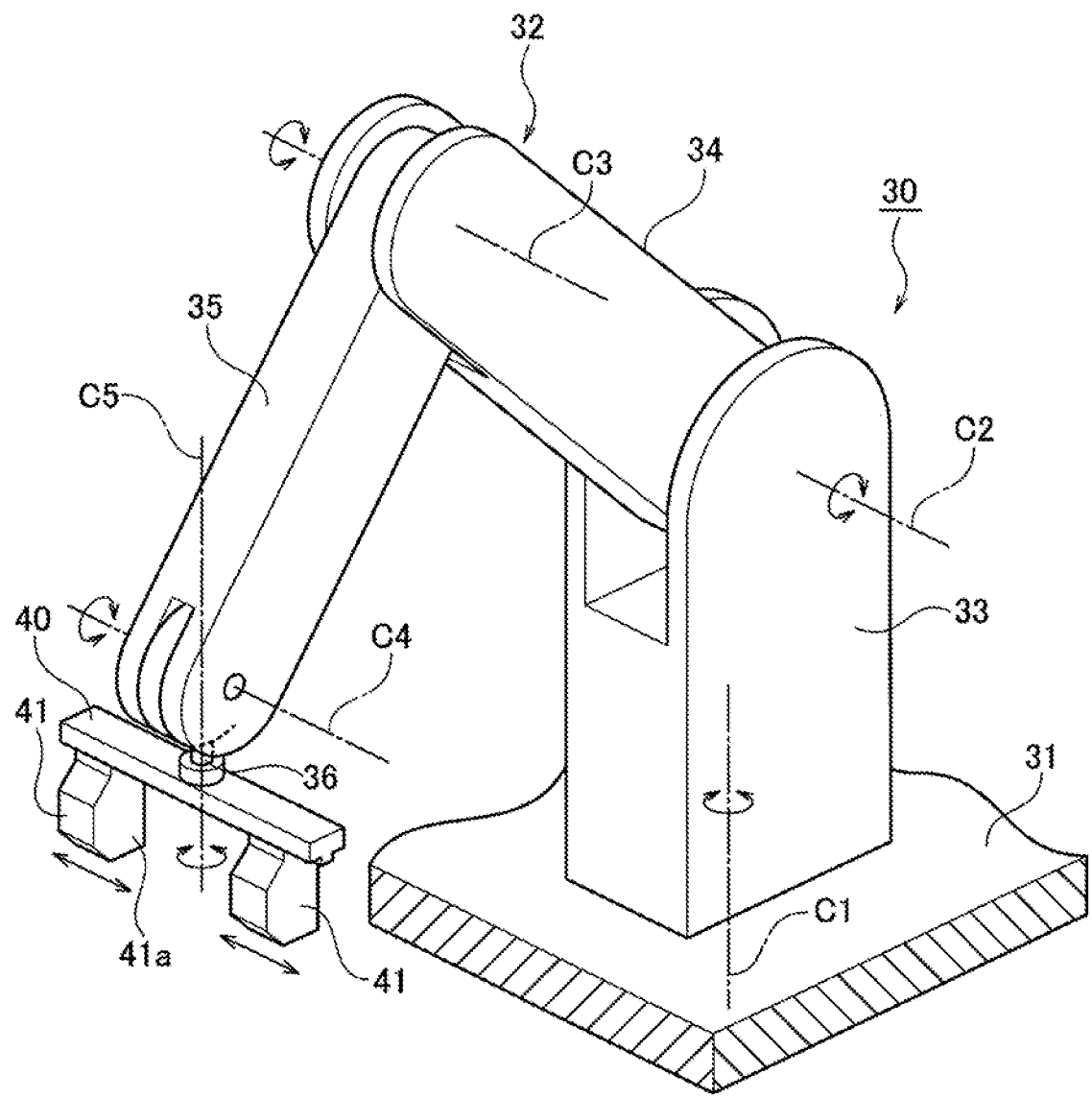
FIG. 3 is a perspective view of the connector fitting device according to the first embodiment.

Next, the fitting device 30 is described. As illustrated in FIG. 3, the fitting device 30 includes a movable arm body 32 connected to a base 31 on a base end side of the movable arm body 32, and a gripper 40 connected to the distal end side (tip end side) of the movable arm body 32.

The movable arm body 32 includes a device main body 33, a first arm 34, a second arm 35, and a third arm 36. The device main body 33 is provided on the base 31. Further, the device main body 33 can rotate about an axis (first axis) C1.

The axis (first axis) C1 is, for example, orthogonal to a horizontal plane. In this case, the device main body 33 rotates in the horizontal plane. The first arm 34 is rotatably connected to the distal end portion (tip end portion) of the device main body 33. The first arm 34 can rotate about an axis (second axis) C2. The axis (second axis) C2 is orthogonal to the axis (first axis) C1. For example, the first arm 34 rotates in a vertical plane which is orthogonal to the above-described horizontal plane.

The second arm 35 is rotatably connected to the distal end portion of the first arm 34. The second arm 35 can rotate about an axis (third axis) C3. The axis (third axis) C3 extends in the same direction as the axis (second axis) C2. That is, the axis (third axis) C3 is parallel to the axis (second axis) C2. Therefore, the second arm 35 can rotate in a plane in which the first arm 34 rotates.

The third arm 36 is rotatably connected to the distal end portion of the second arm 35. The third arm 36 can rotate about an axis (fourth axis) C4. The axis (fourth axis) C4 extends in the same direction as the axis (second axis) C2. That is, the axis (fourth axis) C4 is parallel to the axis (second axis) C2.

The gripper 40 is rotatably connected to the distal end portion of the third arm 36. The gripper 40 can rotate around the axis (fifth axis) C5. The axis (fifth axis) C5 extends in the same direction as the axis (first axis) C1. That is, the axis (fifth axis) C5 is parallel to the axis (first axis) C1.

In other words, a rotary joint is used to connect between the base 31 and the device main body 33, the device main body 33 and the first arm 34, the first arm 34 and the second arm 35, the second arm 35 and the third arm 36, and the third arm 36 and the gripper 40. With such a configuration, the gripper 40 can be moved to an arbitrary position in the three-dimensional space and can be directed in an arbitrary direction in the three-dimensional space. Specifically, the gripper 40 is moved to an arbitrary position in the three-dimensional space by the rotation of the device main body 33, the first arm 34, and the second arm 35. By the rotation of the third arm 36 and the rotation of the gripper 40 itself, the gripper 40 is directed in an arbitrary direction in the three-dimensional space. The same operation is possible if the second arm 35 and the third arm 36 are connected by a ball joint and the gripper 40 is rigidly connected to the third arm 36.

As illustrated in FIG. 3, the gripper 40 has a pair of clamping portions 41. The pair of clamping portions 41 are slidably provided so that a distance between the clamping portions 41 in the clamping direction (indicated by straight double arrows) can be adjusted. Each clamping portion 41 has a clamping surface 41a facing the opponent clamping portion 41. As will be described later, the clamping surface 41a contacts the surface to be clamped 24 of the female connector 20 when the female connector 20 is clamped by the gripper 40.

Figure 4:
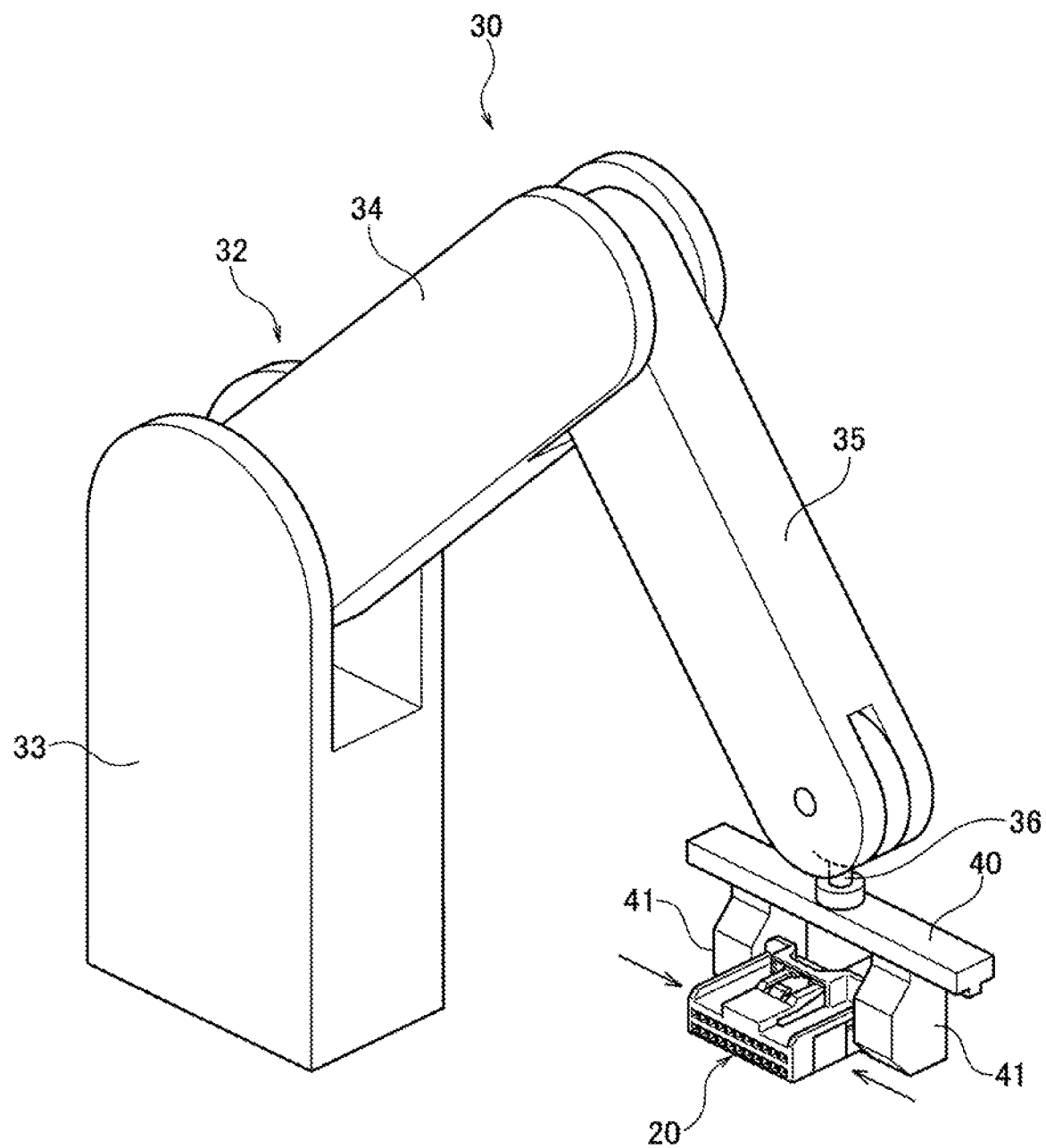
FIG. 4 is a perspective view of a state in which the connector fitting device according to the first embodiment grips the female connector.
Figure 5:
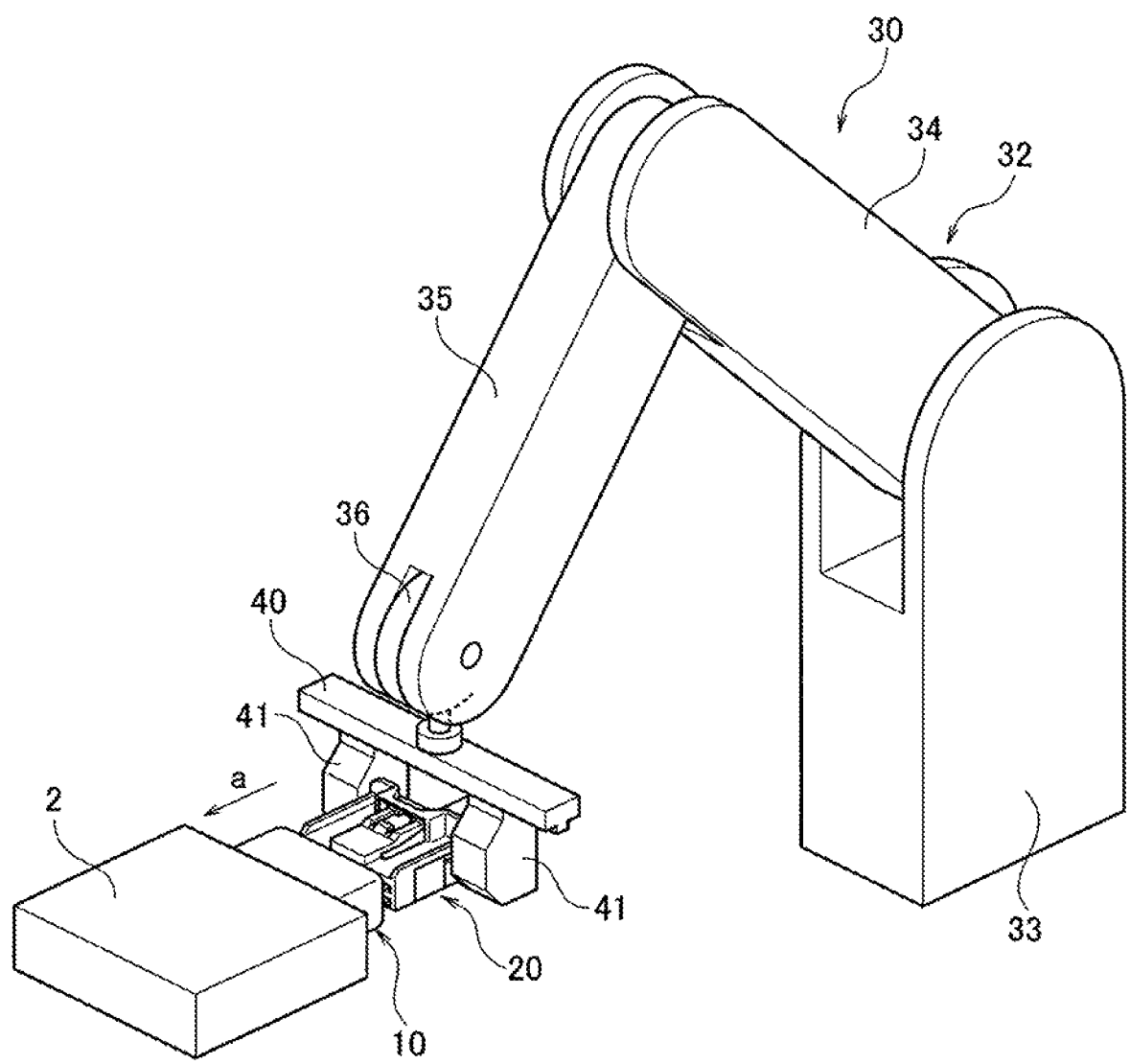
FIG. 5 is a perspective view illustrating a state in which the connector fitting device according to the first embodiment moves the female connector to a position facing a male connector and starts fitting to the male connector.
Figure 6:
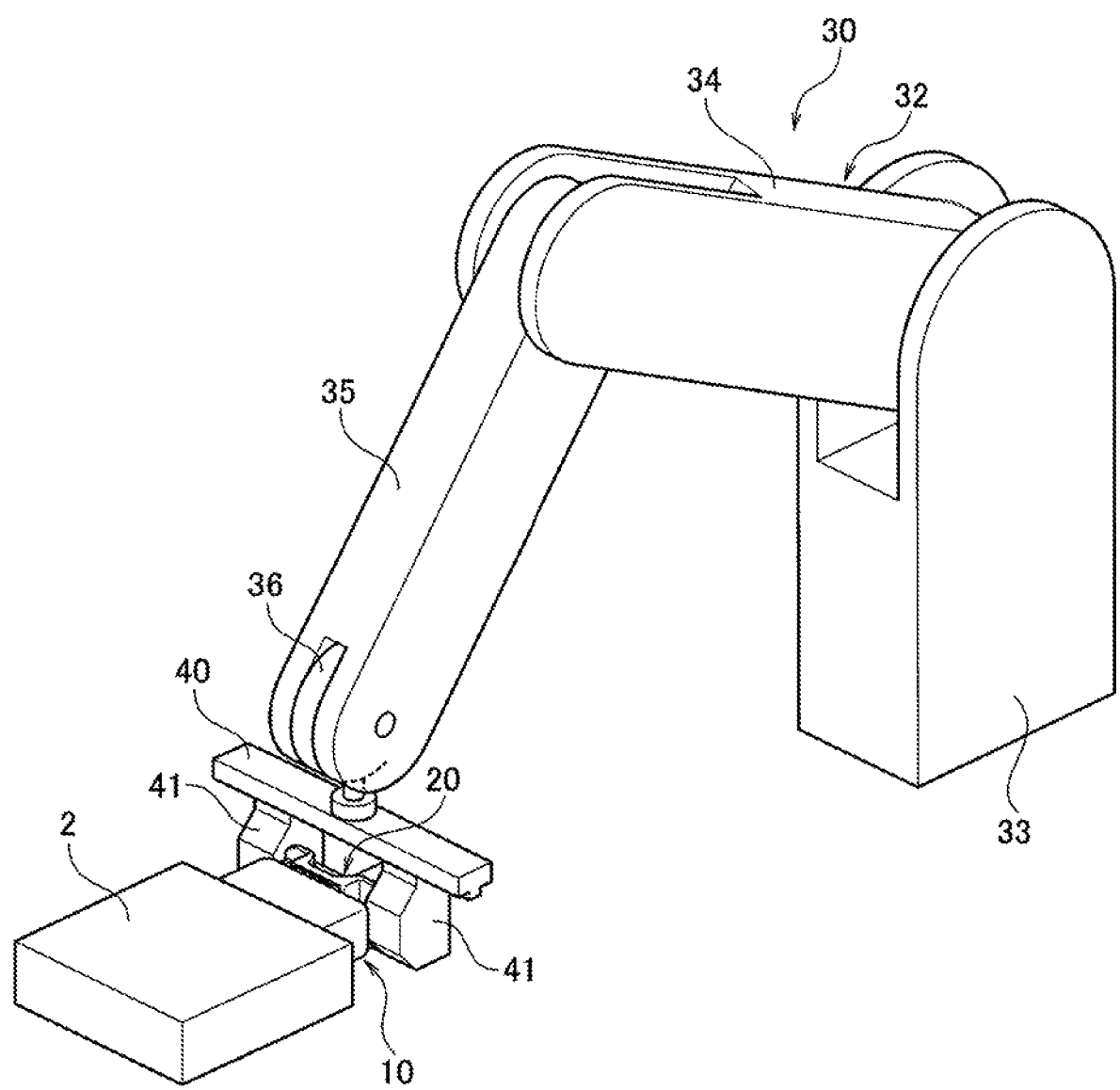
FIG. 6 is a perspective view illustrating a state in which the connector fitting device according to the first embodiment has fitted the female connector to the male connector.

Next, a connector fitting operation using the fitting device 30 is described. The movable arm body 32 moves the gripper 40 to a position at which the female connector 20 is fed and the housing 22 of the female connector 20 can be clamped. Next, as illustrated in FIG. 4, by narrowing the distance between the pair of clamping portions 41, the clamping surface 41a comes into contact with the surface to be clamped 24 on both sides of the housing 22 of the female connector 20 to grip the female connector 20. Then, the movable arm body 32 moves the gripped female connector 20 to a fitting start position facing the male connector 10 in the vicinity of the male connector 10 (see FIG. 5). Next, as indicated by an arrow a in FIG. 5, the movable arm body 32 moves the female connector 20 in the fitting direction, while adjusting the direction in a proper fitting direction to the male connector 10. By the operation of the movable arm body 32, the female connector 20 moves until the housing lock 23 of the female connector 20 engages an opponent housing lock (not illustrated) of the male connector 10. As a result, the female connector 20 is fitted into the male connector 10 as illustrated in FIG. 6. When the fitting of the connectors is completed, the distance between the pair of clamping portions 41 is widened to release clamping of the female connector 20 by the pair of clamping portions 41. Thus, the fitting operation is completed once.

As described above, the fitting device 30 includes the movable arm body 32 connected to the base 31 on a base end side of the movable arm body, and the gripper 40 connected to the distal end side of the movable arm body 32 and capable of gripping the female connector 20, in which the gripper 40 is moved to the arbitrary position in the three-dimensional space and directed in the arbitrary direction in the three-dimensional space. In other words, the fitting device 30 includes the gripper 40 that can grip the female connector 20 and the movable arm body 32 that can change the three-dimensional position and the three-dimensional direction of the gripper 40.

Therefore, there is no need for the operator to move the female connector 20 or perform the connector fitting operation in person. That is, the operator may operate or set automatic operation on the fitting device 30. Therefore, the present embodiment can reduce the burden to the operator in the connector fitting operation.

Second Embodiment

FIGS. 7 to 11 illustrate a second embodiment of the present disclosure. The second embodiment differs from the first embodiment in the configuration of the female connector 20 and the configuration of the pair of clamping portions 41 of the fitting device 30.

Figure 7A:
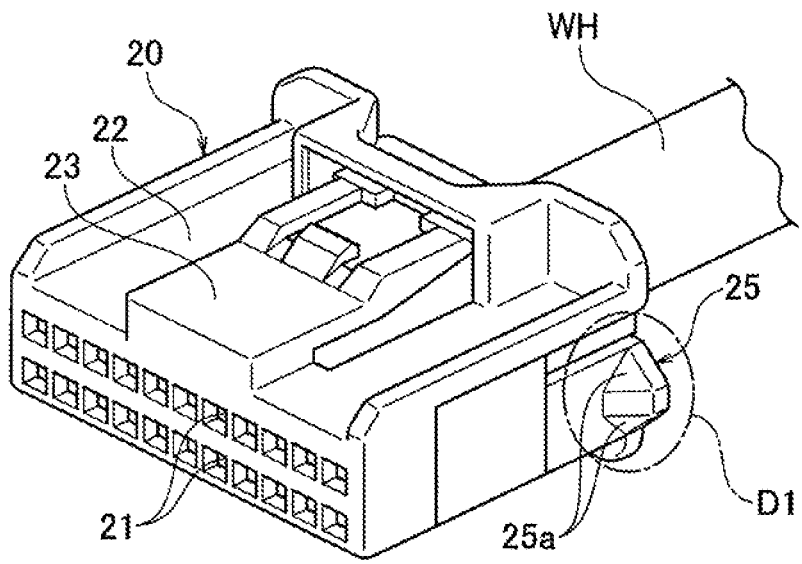
FIG. 7A is a perspective view of a female connector according to a second embodiment of the present disclosure when viewed from the front side.
Figure 7B:
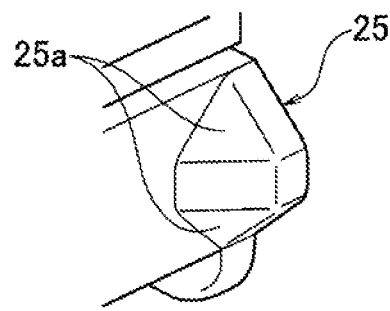
FIG. 7B is an enlarged view of a portion D1 in FIG. 7A.
Figure 7C:
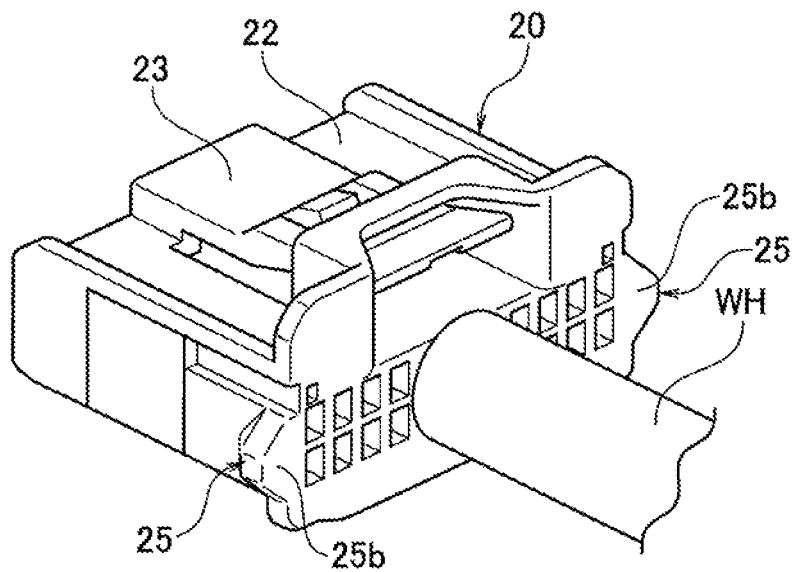
FIG. 7C is the perspective view of the female connector when viewed from the rear surface side.

Specifically, as illustrated in FIGS. 7A to 7C, a protrusion (second protrusion) 25 for preventing misalignment is provided at a rearward position on both side surfaces of the housing 22 of the female connector 20, that is, at a position clamped by the pair of clamping portions 41 of the fitting device 30. Each protrusion 25 is generally a delta cone-shaped protrusion. Each protrusion 25 has two tapered surfaces 25a and a contact surface 25b arranged at the rear end of the two tapered surfaces 25a. The two tapered surfaces 25a and the contact surface 25b constitute a conical surface of the protrusion 25 having a shape similar to a delta cone. The two tapered surfaces 25a are inclined in opposite directions with respect to the vertical direction, and are inclined in opposite directions with respect to a lateral direction. The contact surface 25b is a flat surface extending in the vertical and lateral directions. Here, the vertical direction is a direction orthogonal to the fitting direction of the female connector 20 with respect to the male connector 10 and the clamping direction of the pair of clamping portions 41. Further, the lateral direction is the clamping direction of the pair of clamping portions 41.

Figure 8A:
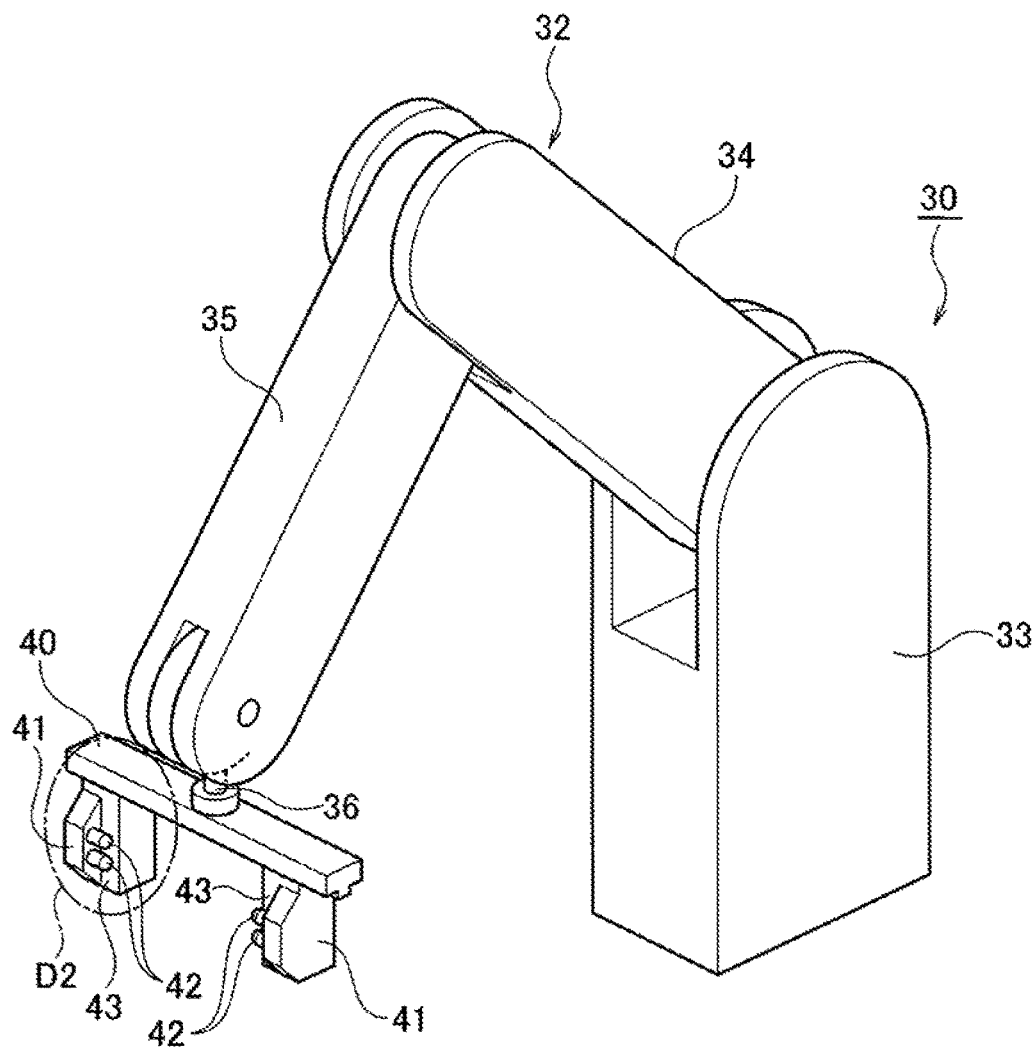
FIG. 8A is a perspective view of the connector fitting device according to the second embodiment.
Figure 8B:
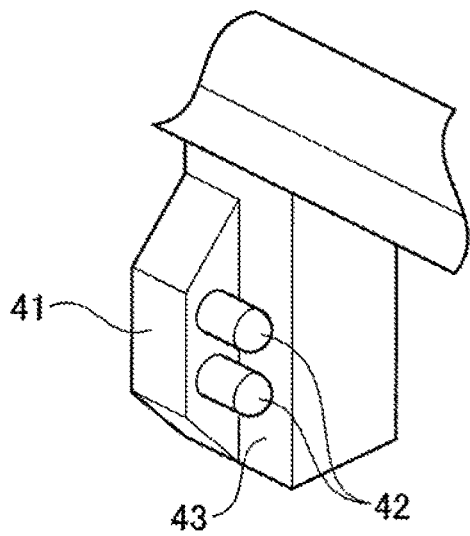
FIG. 8B is an enlarged view of a portion D2 in FIG. 8A.
Figure 11:
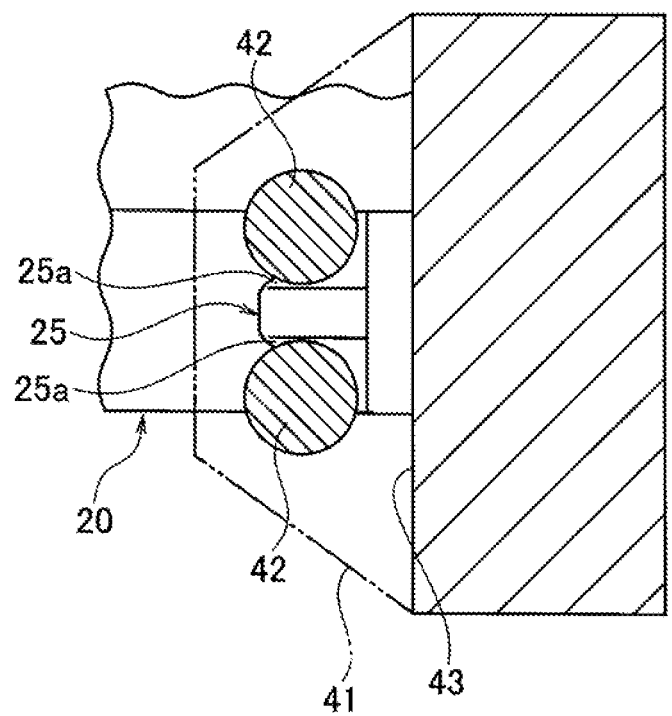
FIG. 11 is a cross-sectional view taken along line bb of FIG. 10.

As illustrated in FIGS. 8A and 8B, each of the pair of clamping portions 41 has two protrusions (first protrusions) 42. The two protrusions 42 in each clamping portion 41 protrude toward the opponent clamping portion 41 and are spaced apart from each other in a predetermined direction. The predetermined direction is, for example, the vertical direction orthogonal to the fitting direction of the female connector 20 with respect to the male connector 10 and orthogonal to the clamping direction of the pair of clamping portions 41. The protrusions 42 are cylindrical rods. The tip end surface of each protrusion 42 is formed as a spherical surface which comes into contact with the opposing tapered surface 25a when the pair of clamping portions 41 clamp the female connector 20. Each of the pair of clamping portions 41 has a contact surface 43. The contact surface 43 is arranged to the rearward of the protrusions 42. Here, "rearward" refers to a position rearward of the female connector 20 in the fitting direction of the female connector 20. The contact surface 43 is formed on a surface orthogonal to the clamping surface 41a. As illustrated in FIG. 11, the contact surface 43 may be a plane parallel to the surface including the arrangement of the two protrusions 42.

Other constituent components are similar to those in the first embodiment, and the description thereof is not repeated. The same reference numbers are given to the same constituent components in the drawings.

Figure 9:
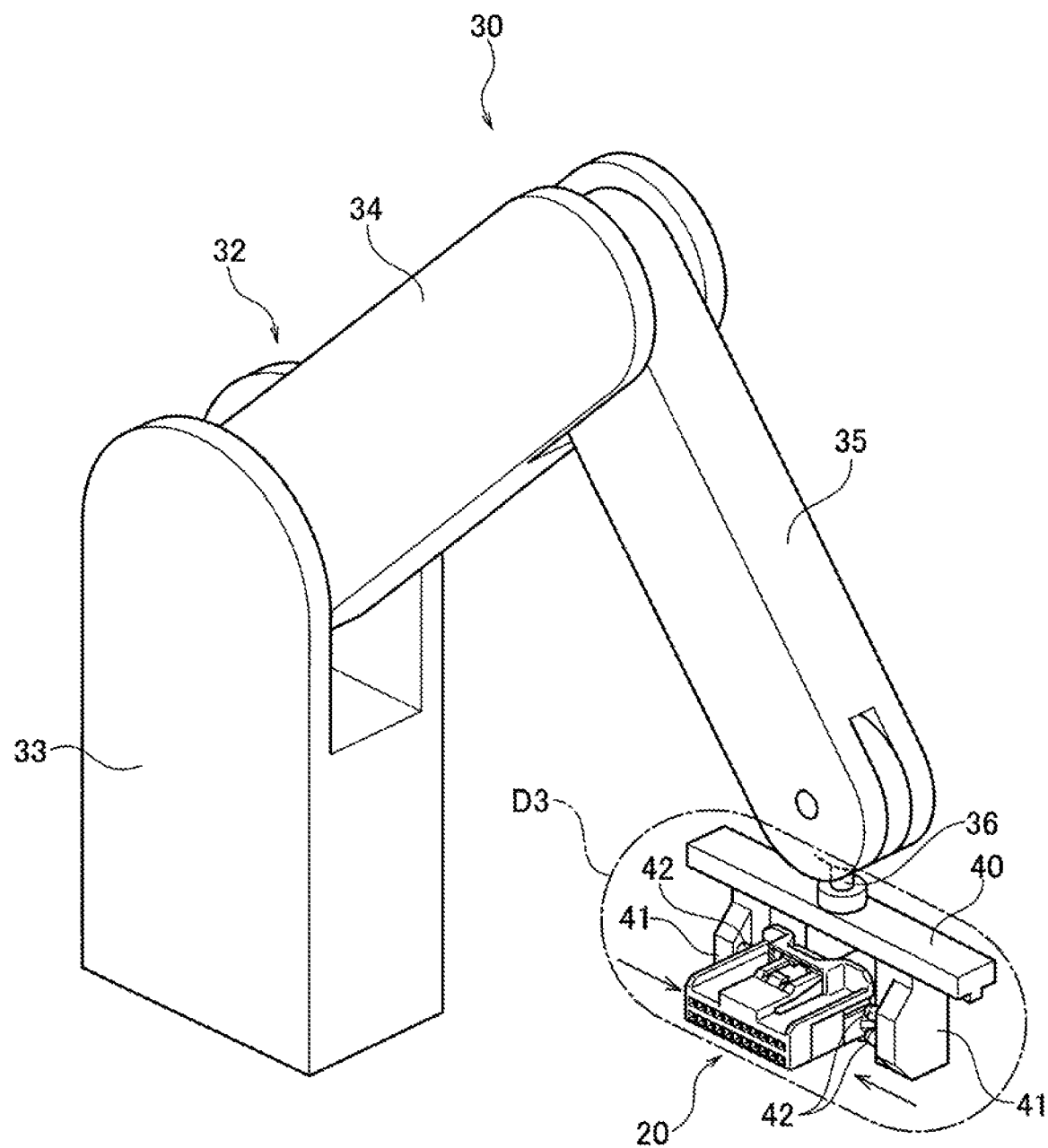
FIG. 9 is a perspective view of a state in which the connector fitting device grips the female connector according to the second embodiment.
Figure 10:
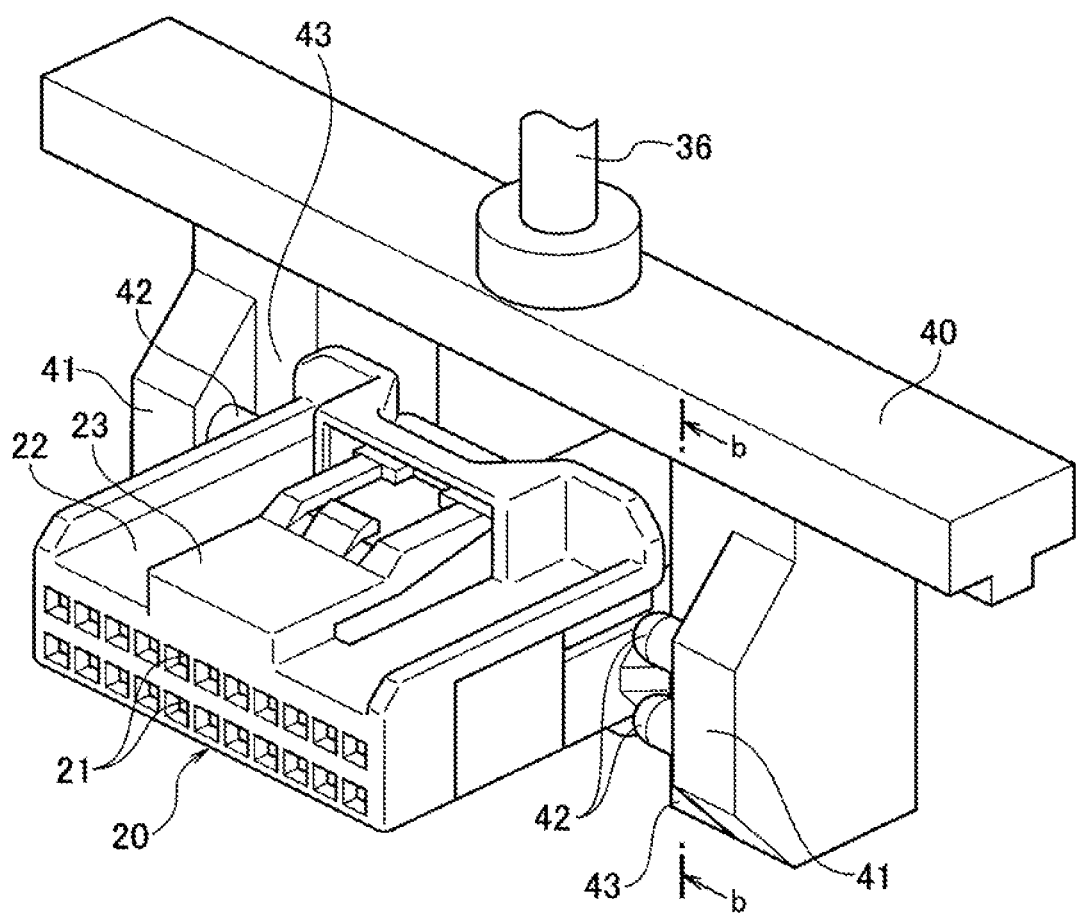
FIG. 10 is an enlarged view of a portion D3 in FIG. 9.

As illustrated in FIGS. 9 and 10, the female connector 20 is clamped by narrowing the distance between the pair of clamping portions 41. When the clamping portions 41 clamp the female connector 20, the protrusions 42 of the pair of clamping portions 41 contact the tapered surface 25a of the protrusion 25 provided on both side surfaces of the housing 22 (see FIG. 7A). Further, the pressing force from the protrusions 42 causes the contact surface 25b (see FIG. 7C) of the housing 22 to contact the contact surface 43 of each clamping portion 41. The pair of clamping portions 41 clamp the housing 22 of the female connector 20 in a state where these abutments are maintained.

Also in the second embodiment, for the same reason as in the first embodiment, the burden to the operator in the connector fitting operation can be reduced.

As illustrated in FIG. 11, in the second embodiment, the housing 22 of the female connector 20 is clamped (supported) in a state where the pair of clamping portions 41 of the gripper 40 is in contact with the female connector 20 at three or more points. This allows the female connector 20 to be firmly gripped. In other words, when the female connector 20 is fitted to the male connector 10 and even when the reaction force generated by the fitting operation acts on the gripper 40 from the female connector 20, the fitting operation of the connectors can be performed reliably without causing displacement of the position and the angle (orientation) of the female connector 20 relative to the gripper 40.

Third Embodiment

Figure 12A:
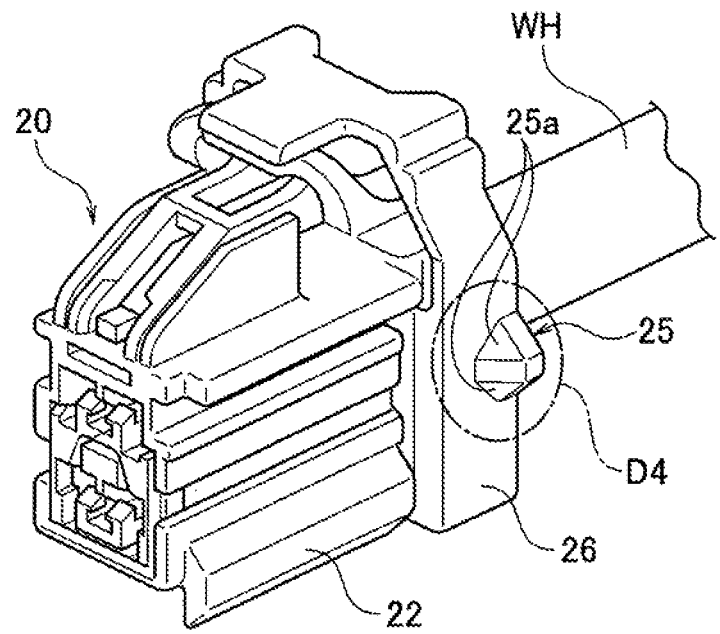
FIG. 12A is a perspective view of a female connector according to a third embodiment of the present disclosure when viewed from the front side.
Figure 12B:
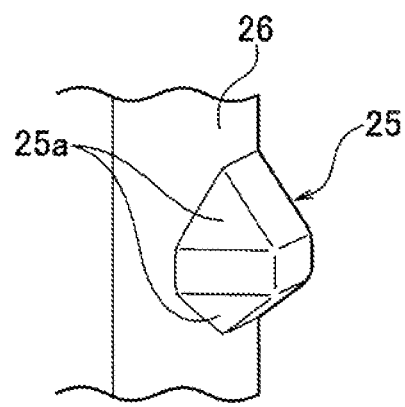
FIG. 12B is an enlarged view of a portion D4 in FIG. 12A.
Figure 12C:
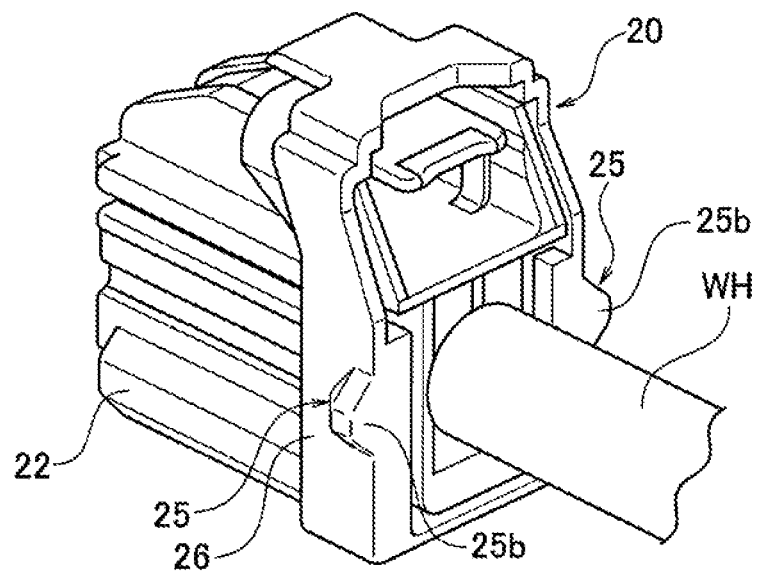
FIG. 12C is a perspective view of the female connector when viewed from the rear surface side.
Figure 13:
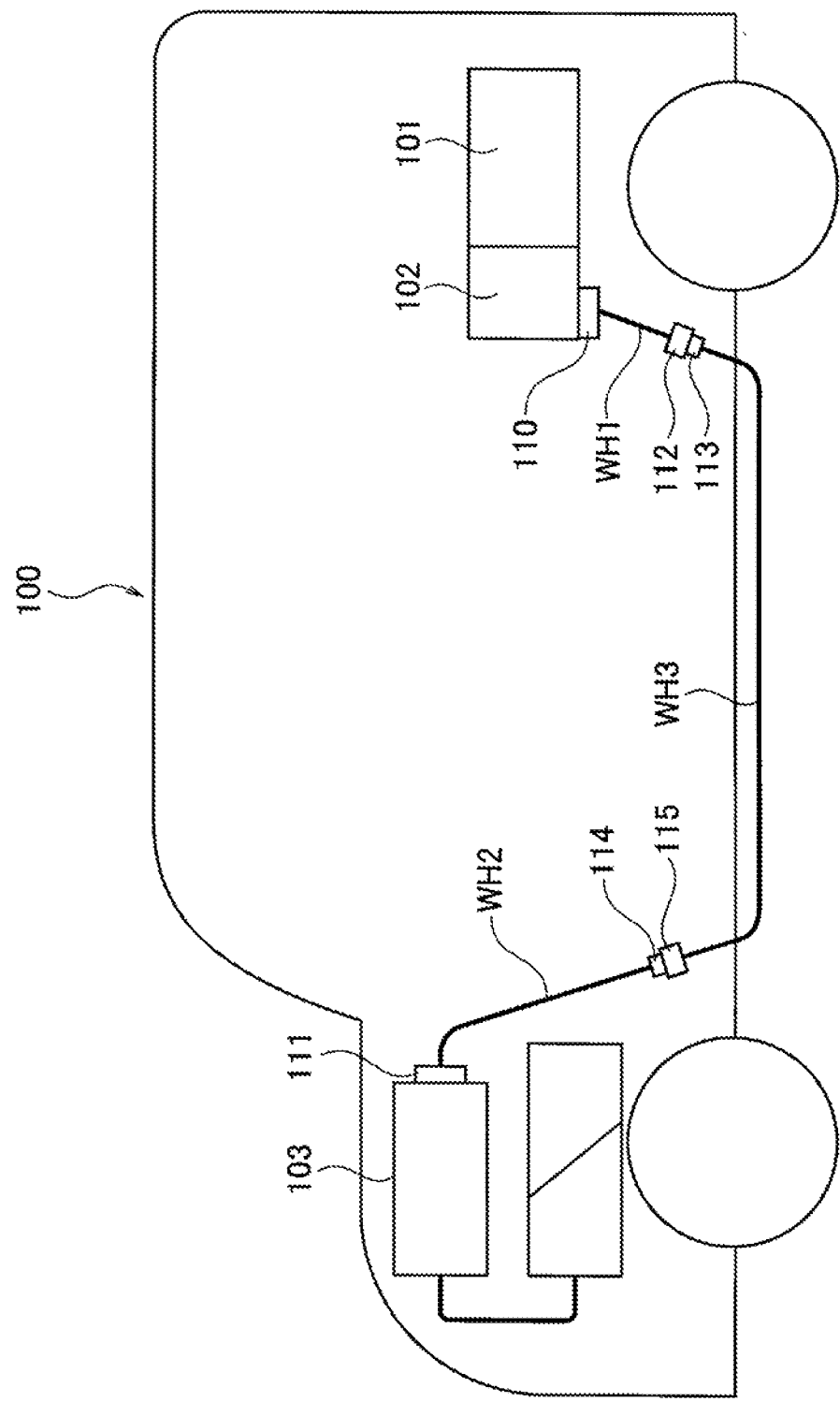
FIG. 13 is a conceptual diagram of electrical connection using wire harnesses in a hybrid vehicle for explaining a conventional example.

FIGS. 12A to 12C illustrate a third embodiment of the present disclosure. The third embodiment is different from the second embodiment only in the configuration of the female connector 20. The configuration of the pair of clamping portions 41 of the fitting device 30 is the same as that of the second embodiment.

In the third embodiment, the female connector 20 includes a housing 22 and a holder 26 attached to cover the rear portion of the housing 22. A protrusion 25 for preventing misalignment is provided on both side surfaces of the holder 26. The protrusion 25 of the third embodiment is configured similarly to the protrusion 25 of the second embodiment, and the description thereof is not repeated. The same reference numbers are given to the same constituent components in the drawings. The form of the housing 22 of the female connector 20 is different from that of the second embodiment, and the form of the male connector (not illustrated) as the opponent connector is also different.

The fitting device 30 is configured similarly to that of the second embodiment, and the description thereof is not repeated.

The third embodiment can also reduce the burden to the operator who performs the connector fitting operation for the same reason as recited in the first embodiment.

Further, the fitting device 30 according to the third embodiment can also grip the female connector 20 firmly for the same reason as recited the second embodiment.

As in the second embodiment, when both side surfaces of the rear portion of the housing 22 are exposed to the outside, the protrusion 25 is provided on both side surfaces of the housing 22. On the other hand, when both side surfaces of the rear portion of the housing 22 are covered by the holder 26, as in the third embodiment, the protrusion for preventing misalignment is provided on both side surfaces of the holder 26.

(Others)

The above-described embodiments have described the fitting of the female connector 20 connected to the wire harness WH to the male connector 10 attached to the housing 2. Alternatively, the male connector 10 may not be attached to the housing 2, and the female connector 20 may not be connected to the wire harness WH. In other words, the present disclosure is applicable to fitting two connectors.

Further, the relationship between the male connector 10 and the female connector 20 may be reversed. In other words, the male connector 10 may be fitted to the female connector 20 which is fixed at a determined position and in a determined direction in the vehicle 1. The fitting device 30 may grip a male connector.

In the above-described embodiments, the movable arm body 32 includes the device main body 33, the first arm 34, the second arm 35, and the third arm 36. Alternatively, the movable arm body 32 may be formed to move the gripper 40 to the arbitrary position in the three-dimensional space and in the arbitrary direction in the three-dimensional space.

The above-described embodiments include the gripper 40 having the pair of clamping portions 41, but the gripper 40 may have other constituent components capable of gripping the connector.

Embodiments of the present disclosure have been described above. However, the disclosure may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes, which come within the meaning and range of equivalency of the claims, are therefore intended to be embraced therein.

Moreover, the effects described in the embodiments of the present disclosure are only a list of optimum effects achieved by the present invention. Hence, the effects of the present invention are not limited to those described in the embodiment of the present disclosure.

What is claimed is:

1. A connector fitting device for fitting a first connector to a second connector, comprising:
   a movable arm body connected to a base on a base end side of the movable arm body; and
   a gripper connected to a distal end side of the movable arm body and capable of gripping the first connector, wherein
   the connector fitting device configured to move the gripper to an arbitrary position in a three-dimensional space and in an arbitrary direction in the three-dimensional space,
   the gripper includes a pair of clamping portions, and
   each of the pair of clamping portions includes first two protrusions protruding toward an opponent clamping portion and arranged spaced apart from each other in a vertical direction, and a contact surface arranged spaced apart from and rearward of a virtual plane on which extending directions of the first two protrusions are included.

2. The connector fitting device according to claim 1, wherein
   the movable arm body includes
   a device main body provided rotatably about a first axis on the base,
   a first arm rotatably connected to the device main body about a second axis orthogonal to the first axis,
   a second arm rotatably connected to a distal end portion of the first arm about a third axis extending in the same direction as the second axis, and
   a third arm rotatably connected to a distal end portion of the second arm about a fourth axis extending in the same direction as the second axis, and
   the gripper is rotatably connected to a distal end portion of the third arm about a fifth axis extending in the same direction as the first axis.

3. The connector fitting device according to claim 1, wherein
   the contact surface is a plane parallel to the virtual surface.

4. The connector fitting device according to claim 1, wherein
   each of the first protrusions has a spherical tip end surface.

5. The connector fitting device according to claim 1, wherein
   the first connector has a second protrusion protruding from both side surfaces of the first connector,
   the second protrusion includes two tapered surfaces inclined in opposite directions with respect to a vertical direction and inclined in opposite directions with respect to a lateral direction, and a contact surface arranged at a rear end of the two tapered surfaces, and
   the pair of clamping portions is configured to grip the first connector in a state where the first two protrusions contact both of the tapered surfaces of the first connector and the contact surface of the first connector contacts each of the two contact surfaces of the pair of clamping portions by pressing force of the first two protrusions.

6. The connector fitting device according to claim 5, wherein
   when both of side surfaces of a rear portion of a housing of the first connector are exposed to the outside, the second protrusion is provided on both side surfaces of the housing, and
   when a holder covers both side surfaces of the rear side of the housing, the second protrusion is provided on both side surfaces of the holder.

7. The connector fitting device according to claim 1, wherein
   each of the pair of clamping portions is configured to clamp respective tapered surfaces of respective delta cone-shaped projections protruded from opposite sides of the first connector, and the respective tapered surfaces of each of the delta cone-shaped projections are spaced apart from each other, at least in a state in which the pair of clamping portions are clamped to the respective tapered surfaces, in the vertical direction.

8. A connector fitting device for fitting a first connector to a second connector, comprising:
- a movable arm body connected to a base on a base end side of the movable arm body; and
- a gripper connected to a distal end side of the movable arm body and capable of gripping the first connector, wherein
- the connector fitting device configured to move the gripper to an arbitrary position in a three-dimensional space and in an arbitrary direction in the three-dimensional space,
- the gripper includes a pair of clamping portions,
- the pair of clamping portions each includes first two protrusions protruding toward an opponent clamping portion and arranged spaced apart from each other in a vertical direction, and a contact surface formed rearward of the first two protrusions,
- the first connector has a second protrusion protruding from both side surfaces of the first connector,
- the second protrusion includes two tapered surfaces inclined in opposite directions with respect to a vertical direction and inclined in opposite directions with respect to a lateral direction, and a contact surface arranged at a rear end of the two tapered surfaces, and
- the pair of clamping portions is configured to grip the first connector in a state where the first two protrusions contact both of the tapered surfaces of the first connector and the contact surface of the first connector contacts each of the two contact surfaces of the pair of clamping portions by pressing force of the first two protrusions.

* * * * *